(12) United States Patent
Bourgeois

(10) Patent No.: US 8,963,667 B2
(45) Date of Patent: Feb. 24, 2015

(54) ASSEMBLY OF MAGNETIC PLATES FOR ELECTROMAGNETIC MACHINES, THE ASSEMBLY BEING PROVIDED WITH FIXING MEANS AND A METHOD OF MANUFACTURING SUCH AN ASSEMBLY OF PLATES

(75) Inventor: Raymond Nicolas Bourgeois, Paris (FR)

(73) Assignee: R. Bourgeois, Besancon (FR)

( * ) Notice: Subject to any disclaimer, the term of this patent is extended or adjusted under 35 U.S.C. 154(b) by 0 days.

(21) Appl. No.: 13/429,209

(22) Filed: Mar. 23, 2012

(65) Prior Publication Data

US 2012/0242441 A1    Sep. 27, 2012

(30) Foreign Application Priority Data

Mar. 25, 2011    (FR) ...................................... 11 52512

(51) Int. Cl.
*H01F 3/00* (2006.01)
*H02K 1/18* (2006.01)

(52) U.S. Cl.
CPC ...................................... *H02K 1/18* (2013.01)
USPC .................... 335/297; 336/210; 310/216.004; 310/216.058

(58) Field of Classification Search
USPC .................... 310/216.004, 216.058; 336/210; 335/297
See application file for complete search history.

(56) References Cited

U.S. PATENT DOCUMENTS 3,612,930 A * 10/1971 Raby ...................... 310/216.087
3,885,302 A *  5/1975 Boesel ............................ 29/596
4,634,909 A     1/1987 Brem

FOREIGN PATENT DOCUMENTS

EP    0 175 075 A1    3/1986
JP         6113492 A    4/1994
JP       2005287113 A   10/2005

OTHER PUBLICATIONS

Merriam-Webster Dictionary, definition of "nut".*

* cited by examiner

*Primary Examiner* — Ramon Barrera
(74) *Attorney, Agent, or Firm* — Muncy, Geissler, Olds & Lowe, P.C.

(57) ABSTRACT

Packet of plates provided with fixing means, characterized in that at least some of the plates have a cut-out to form a housing receiving an insert provided with fixing means and having a fixing axis, the housing having at least one wall cooperating with an exterior surface of the insert to retain the insert along the fixing axis.
Method of manufacturing such a packet.

9 Claims, 2 Drawing Sheets

Figure 1:
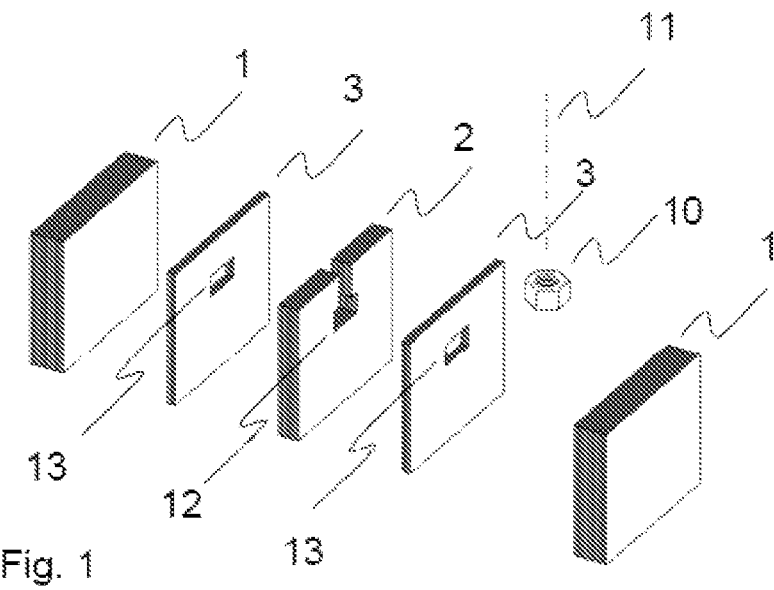

ASSEMBLY OF MAGNETIC PLATES FOR ELECTROMAGNETIC MACHINES, THE ASSEMBLY BEING PROVIDED WITH FIXING MEANS AND A METHOD OF MANUFACTURING SUCH AN ASSEMBLY OF PLATES

The present invention concerns an assembly of plates provided with fixing means and a method of manufacturing such an assembly of plates.

This type of assembly of plates (or packet of plates) is more particularly intended to be used for the production of armatures for electromagnetic machines, for example an alternator or motor stator or rotor, transformer armatures, etc.

Such a packet is conventionally produced from a strip of sheet metal from which are cut out the plates intended to form the packet of plates. The plates are cut out by means of tools including punches that are activated or deactivated to form different openings according to the plates. The plates cut out in this way are stacked against each other and fixed to each other by welding, riveting, clipping or interlocking (mutual interengagement of corresponding stamped elements in adjacent plates), keying, etc.

There is a plurality of possible embodiments of the screwing means.

In a first embodiment, a thread is produced directly in the packet of plates. The heterogeneous structure of the packet of plates causes machining stresses leading to relatively high manufacturing tolerances and wear of the tools. Furthermore, this necessitates reworking by machining the packet of plates formed.

In a second embodiment, a thread is produced by welding a nut to the packet of plates. The surface mounting of the nut imposes constraints on the possible designs of the packets of plates. This fixing method furthermore also necessitates reworking machining, penalizing productivity.

The same problems arise with other types of fixing, such as fixings by spring washers which necessitate that pins be fixed to the packet of plates. Such a pin is intended to be engaged in an opening in a frame and provided with a spring washer preventing its extraction from the opening.

An object of the invention is to provide packets of plates provided with fixing means that are simple to manufacture and fit.

To this end, the invention provides an assembly of magnetic plates for electromagnetic machines, the assembly being provided with means for fixing an external element. At least some of the plates have a cut-out to form a housing receiving an insert provided with fixing means and having at least one fixing axis, the housing being arranged to retain the insert in the assembly.

By fixing axis is meant the direction in which the assembly of plates is retained relative to another part or a part is retained relative to the assembly of plates. The external element may be a support on which the assembly is mounted or a part mounted on the assembly. Accordingly, with the invention, the fixing means are arranged on an attached insert which is fixed to the assembly of plates by cut-outs produced in some of the plates. Furthermore, the insert is completely integrated into the assembly of plates. The retaining of the insert on the assembly allows the assembly to be manipulated without any risk of loss of the insert which is preferably maintained in its fixing position. The resistance of the insert to an insert removing force along the fixing direction is provided by at least one wall of the housing cooperating with an exterior surface of the insert to withstand an insert removing force along the fixing direction.

The invention also provides a method of manufacturing a set of magnetic plates for electromagnetic machines, provided with fixing means, the assembly of plates being formed by stacking plates to form the assembly of plates, the method comprising the steps of:

prior to stacking, producing in at least some of the plates a cut-out to form a housing portion therein, and starting to stack the cut-out plates to form the housing and disposing therein an insert provided with fixing means, the insert having a fixing axis, stacking the rest of the plates to close the housing at least partially, the housing having at least one wall cooperating with an exterior surface of the insert to retain the insert in the fixing direction.

This method of manufacture is particularly suitable, as much technically as economically, for producing a packet of plates provided with fixing means.

Other features and advantages of the invention will emerge from a reading of the following description of particular nonlimiting embodiments of the invention.

Figure 2:
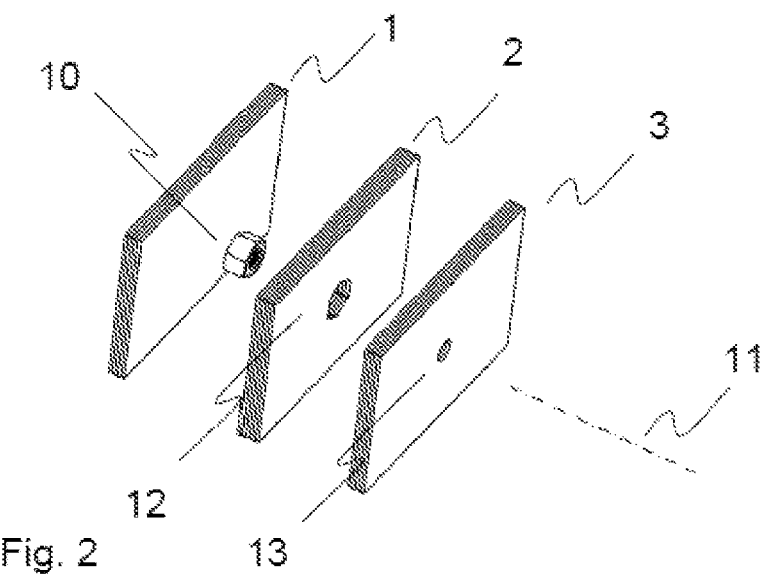
Figure 3:
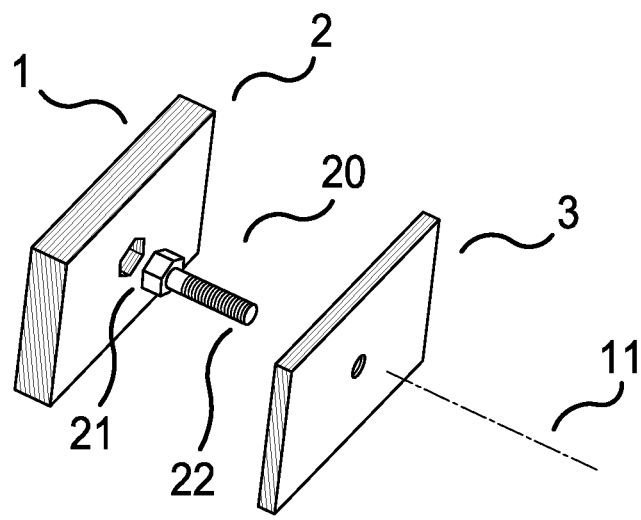
Figure 4:
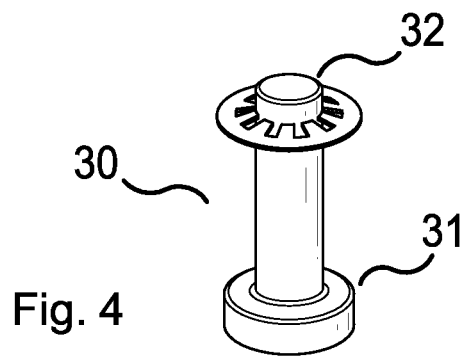
Figure 5:
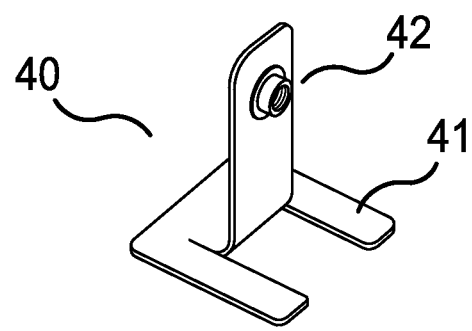

Reference is made to the appended drawings, in which:

FIG. 1 is an exploded perspective view of an assembly of plates of a first embodiment, FIG. 2 is an exploded perspective view of an assembly of plates of a second embodiment, FIG. 3 is an exploded perspective view of an assembly of plates of a third embodiment, FIG. 4 is a perspective view of a second type of fixing means, FIG. 5 is a perspective view of a third type of fixing means.

Referring to FIGS. 1 to 3, the invention concerns an assembly of plates, hereinafter called a packet of plates, including magnetic plates 1, 2, 3 assembled by any process such as welding, riveting, clipping or interlocking (mutual interengagement of elements, for example a tongue and an opening, stamped in corresponding relationship in adjacent plates), keying, etc., and integrating screwing means. By screwing means is meant any component adapted to cooperate in screwing fashion with another component. These screwing means either fix the packet of plates to a frame or another device or fix to the packet of plates a component, a casing or another device.

Such a packet is produced from a strip of sheet metal from which are cut out the plates intended to form the packet of plates. The plates are cut out by means of a press provided with tools including punches that are activated or deactivated to form the exterior contour of each plate and where appropriate openings intended to form a well or a bore in the packet of plates once the plates have been assembled. The tools also stack the cut-out plates.

The principle of the invention relies on the production of a cavity or housing in the packet of plates to accommodate therein some or all of an insert forming the screwing means. The plates without cut-out of with a cut-out smaller to an insert section facing said cut-out maintain the insert in the packet.

In the first and second embodiments the screwing means are formed by a nut 10 having a screwing axis 11 and, transversely to the screwing axis 11, a section which here is of hexagonal shape. It goes without saying that this section may have another non-circular shape.

In the first embodiment, some of the plates, namely the plates 2, include a cut-out 12 having a T-shaped open contour having a bar accepting the nut 10 and a leg leading to an edge of the plate to form a well coinciding with the screwing axis 11 facing the nut 10 in such a manner as to enable a screw to pass through it. The screwing axis 11 is parallel to the plates.

Each plate 3 includes a cut-out 13 having a rectangular closed contour produced in the middle of the plate at a distance from the edges of the plate 3.

The cut-outs 12, 13 in the plates 2 and 3 form housing portions in such a manner that the plates 2, 3 when assembled together delimit a housing for the nut 10, which housing is closed by the plates 1 that have no cut-outs.

The housing preferably has, transversely to the screwing axis 11, a rectangular section having a length slightly greater than the distance separating the farthest apart summits of the nut and a width slightly greater than the minimum distance separating the parallel faces of the nut 10. The housing is produced in such a manner that the plates 1 lie parallel to the parallel faces of the nut 10 that are closest together and thus prevent rotation of the nut 10 about the screwing axis 11.

Alternatively, the dimensions of the openings may be such that their edges grip the nut 10 tightly in such a manner as to immobilize the nut 10 in rotation about the screwing axis 11.

Here all the openings 12, 13 have an edge perpendicular to the screwing axis 11 to retain the nut 10 by opposing any force tending to extract it along the screwing axis 11.

Thus the cut-outs 12, 13 form a housing receiving the nut 10 and having at least one wall cooperating with an exterior surface of the nut to immobilize the nut 10 in rotation about the screwing axis 11 and to retain the nut 10 along the screwing axis 11.

The housing preferably has dimensions allowing transverse play of the nut 10 in the housing to facilitate subsequent mounting of the element fixed by screwing.

For example, for an M24 type nut 10, the radial clearance will be 1 mm.

The housing may also be arranged to allow axial play of the nut 10.

In the second embodiment, the cut-outs are such that the screwing axis 11 of the nut 10 is perpendicular to the plates.

In this embodiment, the openings 12 have a contour corresponding to the exterior shape of the nut 10, as seen in section transversely to the screwing axis 11. The edges of the cut-outs 12 immobilize the nut 10 in rotation about the screwing axis 11.

The cut-outs 13 have a circular contour the axis of which coincides with the pivot axis 11 to form the well facing the nut. The cut-out 13 has a diameter less than the greatest transverse dimension of the nut 10. The first plate 3 adjacent a plate 2 retains the nut 10 along the screwing axis 11.

The first plate 1 adjacent a plate 2 closes the housing.

In the third embodiment, the insert is a screw 20 including a head 21 the exterior surface of which is not circular and a threaded shank 22 projecting from the packet of plates.

The screw 20 has a screwing axis 11 which here is perpendicular to the plates. Alternatively, the screwing axis 11 of the screw 20 may be parallel to the plates.

The arrangement of the cut-outs in the plates is identical to that of the second embodiment: the head 21 is received in the housing portion formed by the cut-outs 12 and the shank 22 is received in the housing portion formed by the cut-outs 13.

FIG. 4 shows an insert adapted to form another type of fixing means. Here the insert comprises a shouldered pin 30 including a head 31 and a shank 32 onto which a spring washer is forcibly engaged.

The shouldered pin 30 is received in a housing of the same type as that of the packet of plates of the first embodiment and the third embodiment. The housing is such that the free end of the shank 32 projects from the packet of plates.

FIG. 5 shows an insert adapted to form a further type of fixing means. Here the insert comprises a plate 40 including a portion 41 bent to form a base for anchoring the insert in the packet of plates and a portion 42 supporting a nut. The bent portion 41 is adapted to be received in a housing of the packet of plates and the support portion 42 is adapted to project from the packet of plates when the bent portion 41 is received in the housing of the packet of plates.

The screwing axis of the nut is perpendicular to the support portion 42.

Of course, the invention is not limited to the embodiments described and encompasses any variant falling within the scope of the invention as defined by the claims.

In particular, the packet of plates may comprise one or more inserts having parallel or non-parallel screwing axes.

Furthermore, the nut or the screw head may have a circular exterior surface. The nut or the screw head may then be force-fitted in the housing so as to be immobilized in rotation and in translation or include a radial face provided with a relief cooperating with a relief of corresponding shape on the housing.

In the first embodiment, the cutouts 12 may have an open contour of rectangular shape leading to the edge of the plate. Axial retention is provided by an edge of the cut-outs 13 while the well has a substantially rectangular cross section.

The cut-outs 12, 13 of the first embodiment may accommodate a screw instead of the nut.

In the first embodiment, the bar of the cut-outs 12 may be slightly longer than the minimum distance separating two parallel faces of the nut to prevent rotation of the nut (as a result of this the nut is pivoted through an angle of 90° about the screwing axis relative to the embodiment described).

The same would apply to the angular positioning of the head 21 of the screw 20 if the nut 10 were replaced by a screw 20 in the first embodiment.

The invention claimed is:

1. An assembly of magnetic plates for electromagnetic machines, the plates having a same thickness and being all stacked together along a unique direction of stacking, the assembly being provided with means for fixing an external element, characterized in that at least a first group of the plates have a first cut-out extending at least in a direction perpendicular to a main surface of said first group of plates to form a housing receiving an insert provided with fixing means and having at least one fixing axis, wherein at least one plate of a second group of the plates having a main surface positioned on said main surface of said plates of said first group is without a cut-out or with a second cut-out smaller than a section of said insert facing said second cut-out so that said insert is fixed to the assembly of plates by the walls of said first cut-out and by said at least one plate of second group of plates.

2. The assembly according to claim 1, wherein the fixing means are screwing means and the fixing axis is a screwing axis, at least one wall of the housing cooperating with the exterior surface of the insert to immobilize the insert in rotation about the screwing axis and to retain the insert along the screwing axis.

3. The assembly according to claim 2, wherein the insert is a nut the exterior surface of which is not a circular surface, the cut-outs forming a well parallel to the screwing axis facing the nut to allow a screw to pass through.

4. The assembly according to claim 3, wherein the cut-out produced in some of the plates has a T-shape having a leg leading to an edge of the plate and the cut-out produced in other plates has a rectangular shape produced in the middle of the plate.

5. The assembly according to claim 2, wherein the insert is a screw having a head the exterior surface of which is not a circular surface and a threaded shank projecting from the assembly of plates.

6. The assembly according to claim 2, wherein the insert comprises an anchor portion received in the housing and a free portion that projects from the assembly of plates and is provided with a nut.

7. The assembly according to claim 2, wherein the screwing axis is parallel to the plates.

8. The assembly according to claim 2, wherein the screwing axis is perpendicular to the plates.

9. The assembly according to claim 1, wherein the fixing means comprise a shouldered pin having a head received in the housing and a shank having a free end that projects from the assembly of plates.

* * * * *